United States Patent
Henriksen et al.

(10) Patent No.: US 8,109,095 B2
(45) Date of Patent: Feb. 7, 2012

(54) METHOD AND AN APPARATUS FOR PRODUCING AND REGULATING ELECTRICAL POWER

(75) Inventors: Niels Henriksen, Fredericia (DK);
Martin Høgh Møller, Fredericia (DK)

(73) Assignee: Dong Energy Power Holding A/S, Fredericia (DK)

( * ) Notice: Subject to any disclaimer, the term of this patent is extended or adjusted under 35 U.S.C. 154(b) by 707 days.

(21) Appl. No.: 11/719,280

(22) PCT Filed: Oct. 3, 2005

(86) PCT No.: PCT/DK2005/000628
§ 371 (c)(1),
(2), (4) Date: Jan. 2, 2009

(87) PCT Pub. No.: WO2006/050726
PCT Pub. Date: May 18, 2006

(65) Prior Publication Data
US 2009/0165459 A1 Jul. 2, 2009

(30) Foreign Application Priority Data
Nov. 15, 2004 (EP) .................................. 04388074

(51) Int. Cl.
*F01K 13/00* (2006.01)
(52) U.S. Cl. .......................................... 60/645; 60/660
(58) Field of Classification Search .................. 60/643, 60/645, 670; 290/1 R, 2
See application file for complete search history.

(56) References Cited

U.S. PATENT DOCUMENTS

| | | | |
|---|---|---|---|
| 4,057,736 A | 11/1977 | Jeppson | |
| 6,380,637 B1 * | 4/2002 | Hsu et al. | 290/1 R |
| 6,512,966 B2 * | 1/2003 | Lof et al. | 700/291 |
| 6,598,398 B2 * | 7/2003 | Viteri et al. | 60/716 |
| 6,670,721 B2 * | 12/2003 | Lof et al. | 290/44 |

FOREIGN PATENT DOCUMENTS
EP 1102187 5/2001
SU 1260641 9/1986

OTHER PUBLICATIONS

Makansi J; "Through the IT looking glass appears a new kind of company" Power, Hill Pub. Co., New York, NY, US, vol. 143, No. 5, Sep. 1999, pp. 22-24, 26, XP000860784, ISSN: 0032-5929.

* cited by examiner

*Primary Examiner* — Hoang Nguyen
(74) *Attorney, Agent, or Firm* — Klein, O'Neill & Singh, LLP

(57) ABSTRACT

A method of producing electrical power for delivery on an electrical power supply grid includes (a) providing a combined heat and power plant generating heat and electrical power from one or more of biomass, fossil fuel, and nuclear fuel; (b) providing a fuel producing plant for generating a carbon-based fuel and/or a nitrogen-based fuel using electrical power from the combined heat and power plant and a combination of two or more materials selected from the group consisting of carbon dioxide, hydrogen, carbonaceous gasses, carbonaceous liquids, and nitrogen; (c) determining the need for electrical power on the electrical power supply grid and delivering needed electrical power on the grid; and (d) delivering any excess electrical power to the fuel producing plant.

38 Claims, 1 Drawing Sheet

US 8,109,095 B2

METHOD AND AN APPARATUS FOR PRODUCING AND REGULATING ELECTRICAL POWER

CROSS-REFERENCE TO RELATED APPLICATIONS

This application is the national phase, under 35 U.S.C. §371(c), of PCT/DK2005/000628, filed Oct. 3, 2005, the disclosure of which is incorporated herein by reference.

FEDERALLY SPONSORED RESEARCH OR DEVELOPMENT

Not Applicable

BACKGROUND OF THE INVENTION

The present invention relates to systems and methods concerning supply and regulation of electrical power.

SUMMARY OF THE INVENTION

In a first aspect, the present invention relates to a method of producing and regulating electrical power for delivery on an electrical power supply grid. The method according to the first aspect comprises:
  providing at least one combined heat and power plant generating heat and electrical power from biomass, fossil fuel, nuclear fuel or combinations thereof,
  providing a fuel producing plant for generating carbon or nitrogen-based fuels using electrical power from the at least one combined heat and power plant and a combination of carbon dioxide and hydrogen and/or carbonaceous gasses, and/or carbonaceous liquids and/or nitrogen,
  determining the need for electrical power on the electrical power supply grid and delivering the needed electrical power on the grid, and
  delivering any excess electrical power to the fuel producing plant.

The combined heat and power plant generates heat and electrical power for delivery to a multitude of households. The need for electrical power and the need for heat fluctuate over time.

When production of a specific electrical power is required, the yield of the combined heat and power plant may be reduced. There is an optimal range wherein the combined heat and power plant has the highest yield, however, excess electrical power and/or excess heat may be produced. The excess electrical power and/or the excess heat may be converted to a form that may be stored. In the presently preferred embodiment of the present invention, the excess electrical power and/or the excess heat is guided or led to a fuel producing plant producing carbon and/or nitrogen-based fuels from a combination of carbon dioxide and hydrogen and/or carbonaceous gasses and/or carbonaceous liquids and/or nitrogen and electrical power. In the present context, yield and efficiency is construed as terms describing the level or rate of conversion of fuel or the like, into electrical power.

The combined heat and power plant generates heat and electrical power from biomass, fossil fuel, nuclear fuel or combinations thereof. The biomass is preferably fermented or broken down or decomposed so that the biomass may be utilized in a combustion process for the generation of heat and/or electrical power and/or synthesis gas, as corrosive water-soluble inorganic substances are removed.

The biomass is preferably treated by acid hydrolysis, basic or alkaline hydrolysis or enzymatic hydrolysis, followed by fermentation to ethanol and other fermented products, such as higher alcohols, methane or hydrogen. Alternatively, the enzymatic hydrolysis is followed by thermo-chemical transformation.

The need for electrical power on the electrical power supply grid is determined by a monitoring unit or system.

Specifically, the excess electrical power may be produced due to requirements for production of heat, as a high demand for heat requires the plant to operate at a level or the plant for other reasons is not able to down-regulate where the corresponding production of electrical energy exceeds the need in the electrical power supply grid.

Also, at least one electrical power plant generating electrical power from renewable energy, such as wind power, hydro power, solar energy, tidal energy or wave energy may be provided and electrically connected to the electrical power supply grid.

A second aspect of the present invention relates to a method of producing and regulating electrical power for delivery on an electrical power supply grid. The method according to the second aspect comprises:
  providing at least one electrical power plant generating electrical power from biomass, fossil fuel, nuclear fuel or combinations thereof,
  providing at least one electrical power plant generating electrical power from renewable energy, such as wind power, hydro power, solar energy, tidal energy or wave energy,
  providing a fuel producing plant for generating carbon and/or nitrogen-based fuels using electrical power, and a combination of carbon dioxide and hydrogen and/or carbonaceous gasses and/or carbonaceous liquids and/or nitrogen,
  determining the need for electrical power on the electrical power supply grid and delivering the needed electrical power on the grid, and
  delivering any excess electrical power to the fuel producing plant.

In the presently preferred embodiment of the present invention according to the second aspect, at least one electrical power plant generates electrical power from renewable energy. As the electrical energy provided or generated by such a plant varies as the wind blow, so to speak, the total amount of electrical energy generated by the at least one electrical energy plant generating electrical power from renewable energy and the at least one electrical power plant generating electrical power from other sources, may vary a lot in a short or long period of time, and it is desirable to run the plant not producing electrical energy from renewable energy at a level where the yield of the plant is maximal, some excess electrical energy may be produced.

Instead of e.g. selling the excess electrical energy at the global, local or regional energy market, possibly at prices lower than the cost of producing the energy, it is preferable to store the excess energy for periods of time where the demand for electrical energy is low. Therefore, at least a part of the excess electrical power may originate from the uneven production of electrical power generated from the renewable energy.

Alternatively, an electrical power plant generating electrical power from renewable energy, such as wind power, hydro power, solar energy, tidal energy or wave energy, and
  a fuel producing plant for generating carbon and/or nitrogen-based fuels using electrical power, and a combination of carbon dioxide and hydrogen and/or carbonaceous gasses and/or carbonaceous liquids and/or nitrogen, is used for generating the carbon and/or nitrogen-based fuels for later or almost immediate use in a plant for generating electrical power from the carbon and/or nitrogen-based fuels.

It is an advantage of the present invention that in the method according to the second aspect at least one of the at least one electrical power plant may be a combined heat and power plant. Also, the excess electrical power may be produced due to requirements for production of heat, as discussed earlier.

A third aspect of the present invention relates to a method of producing and regulating electrical power for delivery on an electrical power supply grid comprising:
providing a plurality of electrical power generating units each capable of producing a specific electrical power rating where the unit generates power at an optimal efficiency,
providing a plant for producing carbon and/or nitrogen-based fuels using electrical power from the plurality of electrical power generation units and a combination of carbon dioxide and hydrogen and/or carbonaceous gasses and/or carbonaceous liquids and/or nitrogen,
determining the need for electrical power on the electrical power supply grid and delivering the needed electrical power on the grid, enabling a specific number of power generating units generating electrical power at the optimal efficiency, and
delivering any excess electrical power to the fuel producing plant.

Each of the power generating plants has an optimal setting for utilizing the amount of fuel driving the unit.

At least one of the electrical power generating units may be an electrical power plant generating electrical power from biomass, fossil fuel, nuclear fuel or combinations thereof, or an electrical power plant generating electrical power from renewable energy, such as wind power, hydro power, solar energy, tidal energy or wave energy or a combined heat and electrical power generating unit, or a combination thereof.

The plurality of units may be a mixture of the above mentioned electrical power generating plants, but also embodiments where only one type of electrical power generating plants are present are also possible.

A further advantage of the present invention, relates to providing an apparatus for performing hydrolysis using electrical power,
producing hydrogen and oxygen from water by hydrolysis of water, and
generating the carbon and/or nitrogen-based fuels using the hydrogen.

The carbon and/or nitrogen-based fuels may be produced using a combination of the hydrogen generated from hydrolysis of water and a carbonaceous and/or nitrogen containing source. The process is integrated with heat and power production resulting ion a high plant efficiency.

Providing an apparatus for performing hydrolysis using electrical power enable the production of hydrogen and oxygen from water by hydrolysis of the water on or near the site where it is later to be used for producing the carbon and/or nitrogen-based fuels. Also, at least part of the oxygen may be used for gasification and/or using at least part of the oxygen as combustion air for generating heat and/or electrical power.

Furthermore, the carbon monoxide and/or carbon dioxide and/or nitrogen, or at least a part thereof, may be provided from the at least one combined heat and power plant or the at least one electrical power plant from the burning of biomass and/or fossil fuel.

The collection or containment of carbon monoxide and/or dioxide is also contemplated to improve, i.e. lower, the release of these unwanted gasses into the atmosphere. The collection or containment and use of the gasses including nitrogen is also contemplated to improve, i.e. lower, the need to buy or collect these gasses.

A feature of the present invention relates to either of the methods according to the first or second aspects further comprising:
providing at least one second, apparatus for production of carbon monoxide or carbon dioxide by gasification of biomass, natural gas, coal, by reforming of natural gas or biogas or a combination thereof,
producing the carbon monoxide or carbon dioxide, and
generating said carbon and/or nitrogen-based fuels using the carbon monoxide and/or carbon dioxide.

A further feature relates to the method according to any of the aspects one, two, or three wherein at least one electrical power plant generates electrical power from biomass, the methods may further comprise:
processing any excess or remaining biomass into animal feed and/or fodder and/or organic fibre and/or carbon dioxide or any combinations thereof.

A special feature of the present invention relates to the carbon and/or nitrogen-based fuels being used for cars, trucks, air planes, any combustion engine, heating system, fuel cell system or any combinations thereof, or at least mixed into fuel for the above mentioned engines and/or systems.

The method according to the first aspect may incorporate any of the features mentioned in connection to the method according to the second or third aspect of the present invention, the method according to the second aspect may incorporate any of the features mentioned in connection to the method according to the first or third aspects of the present invention and the method according to the third aspect may incorporate any of the features mentioned in connection to the method according to the first or second aspects of the present invention A fourth aspect of the present invention relates to a system for producing and regulating electrical power for delivery on an electrical power supply grid that comprises:
at least one power plant generating electrical power from biomass, fossil fuel, nuclear fuel or combinations thereof, the at least one power plant electrically connected to the electrical power supply grid,
a fuel producing plant for generating carbon and/or nitrogen-based fuels using electrical power and a combination of carbon dioxide, nitrogen and hydrogen or synthesis gas, the fuel producing plant electrically connected to the electrical power supply grid and/or the at least one power plant,
an apparatus/system for determining the need for electrical power on the electrical power supply grid and determining the amount of excess electrical power,
a control/regulation system for controlling the fuel producing plant so as to control consumption of the excess electrical power in the fuel producing plant.

The discussion in relation to the first and/or second and/or third aspect of the present invention is also applicable in relation with the fourth aspect of the present invention.

The synthesis gas is preferably a mixture of carbon monoxide, carbon dioxide and hydrogen. For the nitrogen-based fuels, the synthesis gas is preferably hydrogen and nitrogen.

In the system according to the fourth aspect at least one of the at least one electrical power plant may be a combined heat and electrical power plant. The generation of heat, e.g. in the form of steam or water with an elevated temperature, requires or results in a specific amount of electrical power, hence, if the requirement for heat rises, and the plant produces more heat, more electrical energy is produced. The excess electrical power may be sold on the local, regional or global energy market, but may also be used as discussed in relation to the first and second aspect of the present invention on or in a plant or system in accordance with the fourth aspect of the present invention.

Also, the system according may further comprise:
at least one additional electrical power plant producing electrical power from renewable energy, such as from wind power, hydraulic power, water power, tidal energy or wave energy, the at least one additional electrical power plant electrically connected to the fuel producing plant and/or the at least one power plant and/or the electrical power supply grid.

As discussed earlier, a system comprising at least one electrical power plant producing electrical power from renewable energy and a fuel producing plant for generating carbon and/or nitrogen-based fuels using electrical power and a combination of carbon dioxide, nitrogen and hydrogen or synthesis gas, wherein the two are electrically connected, may be envisioned.

The fuel producing plant in the system according to the fourth aspect may generate methanol, ethanol, higher alcohols, dimethanolether, RME, DME, methylated, ethylated plant oils, ammonia, or any other carbon and/or nitrogen-based fuel or any combinations thereof.

The carbon and/or nitrogen-based fuels may be used alone as a fuel for e.g. combustion engines or fuel cell systems or other applications wherein a carbon and/or nitrogen-based fuel is to be used.

The system may include in the fuel producing plant an apparatus for performing hydrolysis using electrical power, also, a supply of water, in the form of a pipeline to a tank or a reservoir, or the like, is advantageous for the plant to be able to perform the hydrolysis at any time it is required.

Also, the fuel producing plant may further comprise at least one second apparatus for production of carbon monoxide and/or carbon dioxide by partial oxidation of biomass, natural gas, coal, by steam reforming of natural gas, by dry reforming of natural gas or any combinations thereof. The carbon monoxide and/or dioxide may then be used in the production of the carbon and/or nitrogen-based fuels.

The system according to the fourth aspect may incorporate any of the features derivable from the methods according to the first and/or second aspect of the present invention.

A fifth aspect of the present invention relates to a system for producing and regulating electrical power for delivery on an electrical power supply grid comprising:
a plurality of electrical power generating units each capable of producing a specific electrical power rating where the unit generates power at an optimal efficiency,
a plant for producing carbon and/or nitrogen-based fuels using electrical power from the plurality of electrical power generation units and a combination of carbon dioxide, nitrogen and hydrogen and/or carbonaceous gasses, the plant receiving electrical power from at least one of the units,
determining the need for electrical power on the electrical power supply grid and delivering the needed electrical power on the grid, enabling a specific number of power generating units generating electrical power at the optimal efficiency, and
delivering any excess electrical power to the fuel producing plant.

As the units have an optimal point, the electrical power generated on a specific number of plants may exceed the requirements of the electrical power grid. This excess energy may be utilised in a plant for generating carbon and/or nitrogen-based fuels. The requirements for electrical power on the electrical power grid fluctuates over time, even over short periods of time. The electrical power may be delivered to households, factories, office buildings, streetlights or the like, alternatively any combination of these.

For environmental reasons, each of the plant preferably operates an optimal efficiency for reducing the waste or loss of energy.

At least one of the plurality of electrical power generation units may be a combined heat and power generation plant and/or at least one of the plurality of electrical power generation units is a power generation plant producing power from renewable energy, such as wind power, hydro power, solar energy, tidal energy or wave energy and/or at least one of the plurality of electrical power generation units is a power generation plant producing power from biomass, fossil fuel, nuclear fuel or combinations thereof.

The system according to the fifth aspect may incorporate any of the features derivable from the methods according to the first and/or second and/or third aspect of the present invention.

The system according to the fifth aspect may incorporate any of the features mentioned in connection with the system according to the fourth aspect of the present invention.

BRIEF DESCRIPTION OF THE DRAWINGS

The present invention is now to be discussed in greater detail with non-limiting reference to the drawing, in which.

DETAILED DESCRIPTION OF THE INVENTION

Figure 1:
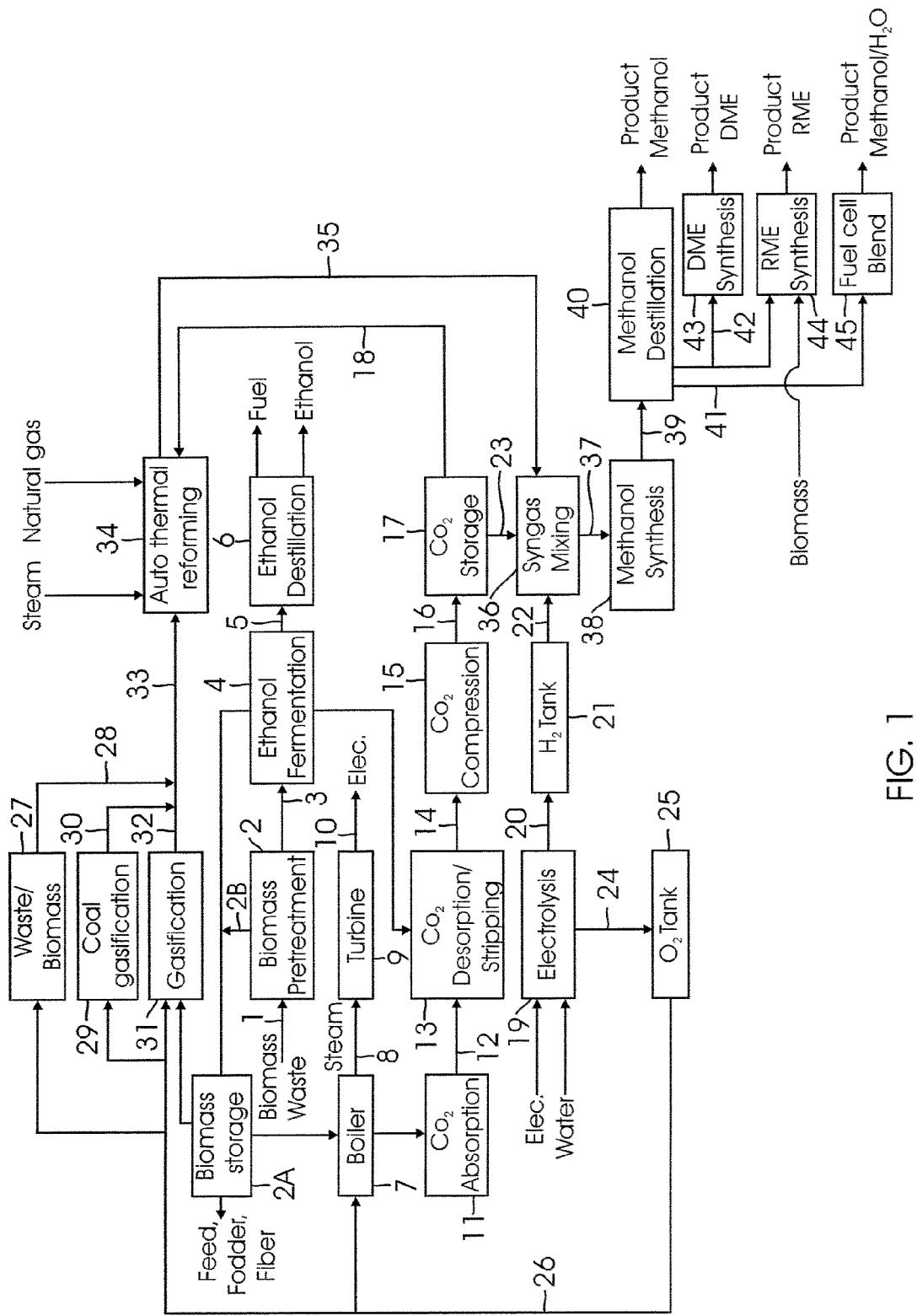
FIG. 1 is a schematic view block diagram illustrating a process for producing carbon and/or nitrogen-based fuels.

FIG. 1 schematically illustrates a process for producing carbon and/or nitrogen-based fuels, preferably being methanol and/or ethanol, from biomass in the form of straw, woods waste, leftovers from foodstuff industry or other biomass resources. The biomass or waste is introduced as illustrated by the arrow 1 into a biomass pre-treatment apparatus or facility 2, wherein the biomass is decomposed, broken down, or biodegraded by hydrological and/or enzymatic processes into monosaccharoses that may be fermented along with a leftover part returned for use for the purposes in the process. The leftover part is returned to a biomass storage facility 2A as indicated by the arrow 2B.

In the pre-treatment process of the biomass or the organic waste, the bulk of the water soluble alkali compounds are removed as these may give rise to corrosion and/or fouling or deposit problems during the energy reforming processes such as the combustion, incineration and/or gasification.

The monosaccharoses produced in the pre-treatment process 2 are transferred into ethanol fermentation 4 as indicated by the arrow 3. The fermentation may be a conventional fermentation using yeast or alternatively by use of thermophile bacteria. The ethanol solution produced in this process is transported for ethanol distillation in a distillation plant or apparatus 6 as indicated by the arrow 5.

The unused part of the biomass 1 returned to a biomass storage is used as additional fuel along with other fuel, such as coal, oil, gas, biomass, waste or the like in a separate boiler 7.

The boiler 7 is used for the production of steam 8 used for heating processes, district heating or production of electricity 10 in a steam turbine 9.

The combustion process in the boiler 7 also produces a flue or waste gas, also including carbon dioxide. The gas is led to an absorption facility 11 where carbon dioxide and/or carbon monoxide are absorbed within an appropriate absorber such as monoethanoamin.

The absorbed carbon monoxide and carbon dioxide are transported 12 to be deabsorbed and stripped in a desorption/stripping facility 13.

The carbon dioxide from the stripper 13 is mixed with carbon dioxide from the fermentation process 4 and is passed 14 to a carbon dioxide compression facility 15 where it is compressed and stored 17 or led 18 to an autothermal natural gas reforming reactor 34 or directly to a syngas mixing station 36 (via 23). The $CO_2$ gas is compressed to a pressure level useful in the following processes. Typically, the carbon dioxide is compressed to approximately 30-150 bar. The compressor may be driven by a steam turbine or electricity.

The compressed carbon dioxide is led 16 to a storage tank from where the carbon dioxide is distributed to the other processes such as natural gas reforming 34 or to a synthesis tank 36.

If a large surplus of carbon dioxide exists, the carbon dioxide may be used for reforming natural gas, thereby increasing the amount of carbon monoxide, which in turn reduces the need for production of hydrogen. The autothermal reforming using carbon dioxide and natural gas is an endoderm process operating at high temperature in the range of 500-900° C. The heat for the process may be in the form of a burner or from other processes. The reformed gas is delivered to the synthesis gas mixture tank 36.

The reforming of natural gas follows the formula:

$$CO_2 + CH_4 \rightarrow 2CO + 2H_2$$

In the mixture tank 36 a mixture of three parts carbon monoxide, one part carbon dioxide and nine parts of hydrogen is preferable. However, divergent mixtures may also be used. The mixture in the mixing tank 36 receives additional hydrogen 22 from an electrolysis process where hydrogen is produced from electrical power and water in an electrolysis tank 19. The hydrogen is preferably produced at a high pressure, or may be compressed by a compressor compressing the produced hydrogen. The hydrogen is transferred 20 into a hydrogen tank 21 connected to the mixing tank 36 via 22.

The electrical power may be supplied from any source of electrical power. In the presently preferred embodiment of the present invention, the electrical power may be supplied from a source producing the electrical power from renewable energy such as wind power, hydro power, solar energy, tidal energy or wave energy or any combinations thereof. Also, at least one electrical power plant producing electrical power from carbon and/or nitrogen-based fuels may supply the electrical power for the hydrolysis process.

As the power plants produce electrical power based on the need of the electrical power supply grid and it is preferable to run these plants at a specific level for obtaining an optimal yield of the plants, there may be periods wherein the plants produce excess electrical power and in these periods it is possible to use this excess electrical power for electrolysis of water for the production of hydrogen. Alternatively, the excess electrical power may be sold on the international or local energy markets, possibly at prices lower than the costs of production of the electrical power.

The autothermal reformer 34 and the mixing tank 36 also receive hydrogen and carbon monoxide 33 from the gasification of untreated waste/biomass 27 (via 28) from coal gasification 29 (via 30), and from pre-treated biomass gasification 31 (via 32). The gasification processes produces heat that may be used for other processes or process steps (electricity, chemical processes and for heating).

It is preferable that the electrolysis process 19 uses electrical power that stems from electrical power plants producing electrical power from renewable energy. The use of electrical power stemming from renewable energy is preferable, as the methanol would have a higher share of renewable energy than if produced on electricity from fossil fuel. Also, the electrolysis could be used to balance varying electricity production from renewable energy sources. Further, it is preferable that the electrolysis is formed at high pressure thereby possibly avoiding additional compression.

From the mixing tank 36 the gas 37 produced in the mixing tank 36 is transferred into a methanol reactor 38 for producing methanol from the gas 37. The methanol synthesis is a catalytic process where typical Cu/Zn/Al are used as catalysts. The methanol synthesis typically runs at 200-300° C. and at a pressure of 50-150 bar.

The methanol synthesis follows the formula:

$$CO + 2H_2 \rightarrow CH_3OH$$

Ethanol is produced using fermentation of biomass and/or waste and follows the formula:

$$C_6H_{12}O_6 \rightarrow 2C_2H_5OH + 2CO_2$$

The methanol synthesis follows the formula:

$$CO_2 + 3H_2 \rightarrow CH_3OH + H_2O$$

The use of carbon dioxide as a basis of methanol production inevitably resolves in one third of the hydrogen bound in water, however, using carbon monoxide as a basis for methanol production or synthesis, a more balanced hydrogen use is contemplated. The methanol synthesis follows the formula:

$$CO + 2H_2 \rightarrow CH_3OH$$

The amount of carbon monoxide may be increased by using oxygen from the electrolysis for gasification of biomass or gasification of natural gas as illustrated in the two following formulas:

$$(C_6H_{10}O_5)n^1 + n/2O_2 \rightarrow 6nCO + 5nH_2$$

$$\tfrac{1}{2}O_2 + CH_4 \rightarrow CO + 2H_2$$

The invention claimed is:

1. A method of producing electrical power for delivery on an electrical power supply grid comprising:
   providing at least one combined heat and power plant generating heat and electrical power from a material selected from the group consisting of biomass, fossil fuel, nuclear fuel, and combinations thereof;
   providing a fuel producing plant for generating at least one of a carbon-based fuel and a nitrogen-based fuel using electrical power from said at least one combined heat and power plant and a combination of two or more materials selected from the group consisting of carbon dioxide, hydrogen, carbonaceous gasses, carbonaceous liquids, and nitrogen;
   determining the need for electrical power on said electrical power supply grid and delivering said needed electrical power on said grid; and
   delivering any excess electrical power to said fuel producing plant.

2. The method according to claim 1, wherein said excess electrical power is produced due to requirements for production of heat.

3. The method according to claim 1, further comprising:
providing at least one electrical power plant generating electrical power from renewable energy.

4. The method according to claim 1, further comprising:
providing an apparatus for performing hydrolysis using electrical power;
using the apparatus to produce hydrogen and oxygen from water by hydrolysis of water; and
generating said fuel using the hydrogen produced by the hydrolysis.

5. The method according to claim 4, further comprising:
using at least part of the oxygen produced by the hydrolysis in the generation of energy.

6. The method according to claim 5, wherein the oxygen is used for gasification.

7. The method according to claim 5, wherein the oxygen is used for combustion.

8. A method of producing electrical power for delivery on an electrical power supply grid comprising:
providing at least one electrical power plant generating electrical power from a material selected from the group consisting of biomass, fossil fuel, nuclear fuel, and combinations thereof;
providing at least one electrical power plant generating electrical power from renewable energy;
providing a fuel producing plant for generating at least one of a carbon-based fuel and a nitrogen-based fuel using electrical power, and a combination of two or more materials selected from the group consisting of carbon dioxide, hydrogen, carbonaceous gasses, carbonaceous liquids, and nitrogen;
determining the need for electrical power on said electrical power supply grid and delivering said needed electrical power on said grid; and
delivering any excess electrical power to said fuel producing plant.

9. The method according to claim 8, wherein at least a part of said excess electrical power originates from the uneven production of electrical power generated from said renewable energy.

10. The method according to claim 9, wherein at least one of said at least one electrical power plant is a combined heat and power plant.

11. The method according to claim 10, wherein said excess electrical power is produced due to requirements for production of heat.

12. The method according to claim 8, further comprising:
providing an apparatus for performing hydrolysis using electrical power;
using the apparatus to produce hydrogen and oxygen from water by hydrolysis of water; and
generating said fuel using the hydrogen produced by the hydrolysis.

13. The method according to claim 12, further comprising:
using at least part of the oxygen produced by the hydrolysis in the generation of energy.

14. The method according to claim 13, wherein the oxygen is used for gasification.

15. The method according to claim 13, wherein the oxygen is used for combustion.

16. A method of producing electrical power for delivery on an electrical power supply grid comprising:
providing a plurality of electrical power generating units each capable of producing a specific electrical power rating where said unit generates power at an optimal efficiency;
providing a plant for producing at least one of a carbon-based fuel and a nitrogen-based fuel using electrical power from said plurality of electrical power generation units and a combination of two or more materials selected from the group consisting of carbon dioxide, hydrogen, carbonaceous gasses, carbonaceous liquids, and nitrogen;
determining the need for electrical power on said electrical power supply grid and delivering said needed electrical power on said grid, enabling a specific number of power generating units generating electrical power at said optimal efficiency; and
delivering any excess electrical power to said fuel producing plant.

17. The method according to claim 16, wherein at least one of said electrical power generating units is an electrical power plant generating electrical power from a_material selected from the group consisting of biomass, fossil fuel, nuclear fuel, and combinations thereof.

18. The method according to claim 16, wherein at least one of said electrical power generating units is an electrical power plant generating electrical power from renewable energy, such as wind power, hydro power, solar energy, tidal energy or wave energy or a combined heat and electrical power generating unit, or a combination thereof.

19. The method according to claim 16, further comprising:
providing an apparatus for performing hydrolysis using electrical power;
using the apparatus to produce hydrogen and oxygen from water by hydrolysis of water; and
generating said fuel using the hydrogen produced by the hydrolysis.

20. The method according to claim 19, further comprising:
using at least part of the oxygen produced by the hydrolysis in the generation of energy.

21. The method according to claim 20, wherein the oxygen is used for gasification.

22. The method according to claim 20, wherein the oxygen is used for combustion.

23. The method according to claim 1, wherein at least one of carbon monoxide, carbon dioxide, and nitrogen is provided from said at least one combined heat and power plant from the burning of an organic fuel selected from the group consisting of at least one of biomass and fossil fuel.

24. The method according to claim 8, wherein at least one of carbon monoxide, carbon dioxide, and nitrogen is provided from said at least one electrical power plant from the burning of an organic fuel selected from the group consisting of at least one of biomass and fossil fuel.

25. The method according to claim 1, further comprising:
providing at least one second apparatus for production of an oxidized carbon gas selected from the group consisting of carbon monoxide and carbon dioxide by the processing of a material selected from the group consisting of at least one of biomass, natural gas, coal, and biogas;
using the second apparatus to produce said oxidized carbon gas; and
generating said fuel using said oxidized carbon gas.

26. The method according to claim 8, further comprising:
providing at least one second apparatus for production of an oxidized carbon gas selected from the group consisting of carbon monoxide and carbon dioxide by the processing of a material selected from the group consisting of at least one of biomass, natural gas, coal, and biogas;
using the second apparatus to produce said oxidized carbon gas; and
generating said fuel using said oxidized carbon gas.

27. The method according to claim 16, further comprising:
providing at least one second apparatus for production of an oxidized carbon gas selected from the group consisting of carbon monoxide and carbon dioxide by the processing of a material selected from the group consisting of at least one of biomass, natural gas, coal, and biogas;
using the second apparatus to produce said oxidized carbon gas; and
generating said fuel using said oxidized carbon gas.

28. The method according to claim 4, wherein at least one electrical power plant generates electrical power from biomass, said method further comprising:
processing any excess or remaining biomass into a product selected from the group consisting of at least one of animal feed, fodder, organic fiber, and carbon dioxide.

29. A system for producing electrical power for delivery on an electrical power supply grid comprising:
at least one power plant generating electrical power from a material selected from the group consisting of at least one of biomass, fossil fuel, and nuclear fuel, said at least one power plant being electrically connected to said electrical power supply grid;
a fuel producing plant for generating at least one of a carbon-based fuel and a nitrogen-based fuel using electrical power and a combination of two or more materials selected from the group consisting of carbon dioxide, nitrogen, hydrogen, and synthesis gas, said fuel producing plant being electrically connected to at least one of said electrical power supply grid and said at least one power plant;
an apparatus for determining the need for electrical power on said electrical power supply grid and determining the amount of excess electrical power; and
a control system operable for controlling said fuel producing plant so as to control consumption of said excess electrical power in said fuel producing plant.

30. The system according to claim 29, wherein at least one electrical power plant is a combined heat and electrical power plant.

31. A system according to claim 29, further comprising:
at least one additional electrical power plant producing electrical power from renewable energy and electrically connected to at least one of said fuel producing plant, said at least one power plant, and said electrical power supply grid.

32. The system according to claim 29, wherein said fuel producing plant generates a product selected from the group consisting of at least one of methanol, ethanol, higher alcohols, dimethanol ether, methylated plant oils, ethylated plant oils, ammonia, and ammonia derivates.

33. The system according to claim 29, wherein said fuel producing plant further comprises apparatus for performing hydrolysis using electrical power.

34. The system according to claim 29, wherein said fuel producing plant further comprises at least one second apparatus for production of an oxidized carbon gas selected from the group consisting of carbon monoxide and carbon dioxide by the processing of a material selected from the group consisting of at least one of biomass, natural gas, and coal.

35. A system for producing electrical power for delivery on an electrical power supply grid comprising:
a plurality of electrical power generating units each capable of producing a specific electrical power rating, wherein each unit generates power at an optimal efficiency;
a plant for producing fuels selected from the group consisting of one or more of carbon-based-fuels and nitrogen-based fuels, using electrical power from the plurality of electrical power generation units and a combination of two or more materials selected from the group consisting of carbon dioxide, hydrogen, carbonaceous gasses, carbonaceous liquids, and nitrogen, said plant receiving electrical power from at least one of said units;
means for determining the need for electrical power on said electrical power supply grid and delivering said needed electrical power on said grid, enabling a specific number of power generating units to generate electrical power at said optimal efficiency; and
means for delivering any excess electrical power to said fuel producing plant.

36. The system according to claim 35, wherein at least one of said plurality of electrical power generation units is a combined heat and power generation plant.

37. The system according to claim 35, wherein at least one of said plurality of electrical power generation units is a power generation plant producing power from renewable energy.

38. The system according to claim 35, wherein at least one of said plurality of electrical power generation units is a power generation plant producing power from a material selected from the group consisting of biomass, fossil fuel, nuclear fuel, and combinations thereof.

* * * * *